H. SMITH.
OPTOMETER.
APPLICATION FILED JULY 18, 1908.
919,481.
Patented Apr. 27, 1909.
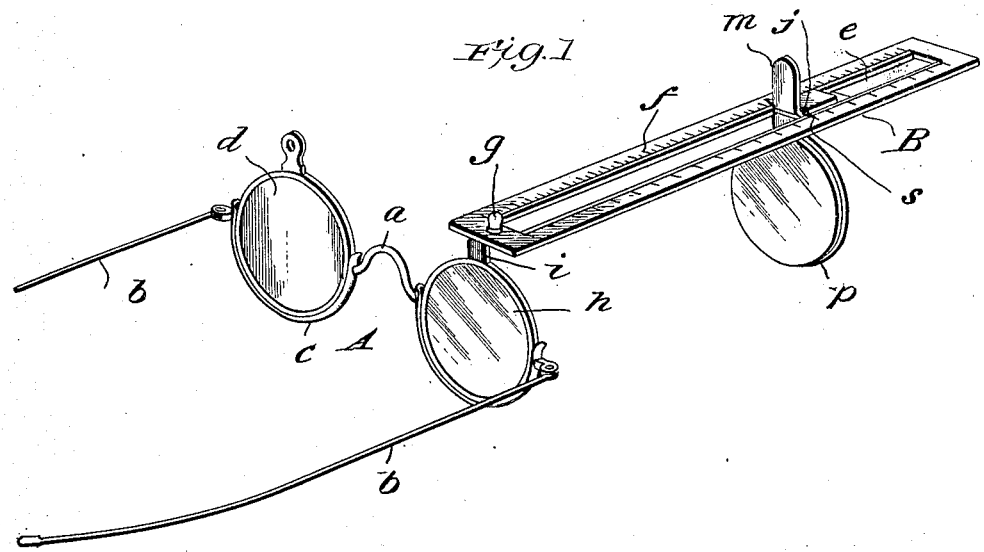
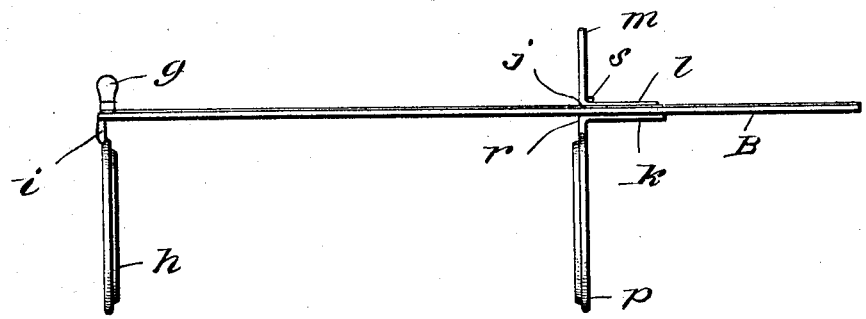

UNITED STATES PATENT OFFICE.

HORACE SMITH, OF MONROE, NORTH CAROLINA.

OPTOMETER.

No. 919,481.   Specification of Letters Patent.   Patented April 27, 1909.

Application filed July 18, 1908.   Serial No. 444,159.

*To all whom it may concern:*

Be it known that I, HORACE SMITH, citizen of the United States, residing at Monroe, in the county of Union and State of North Carolina, have invented new and useful Improvements in Optometers, of which the following is a specification.

My invention pertains to means for testing the eyes; and it has for its general object to provide a light, compact and readily portable device, constructed with a view of being attached to and supported by a patient's head, and of being expeditiously and easily adjusted, while so supported, to enable an oculist or optician to determine the character and extent of defects of the eyes.

With the foregoing in mind the nature of the invention, and its novelty, utility and practical advantages will be fully understood from the following description and claims when the same are read in connection with the drawings accompanying and forming part of this specification, in which:

Figure 1 is a perspective view illustrating the device constituting the best practical embodiment of my invention of which I am cognizant as the same appears when relatively arranged to an attaching frame to test the right eye of a patient. Fig. 2 is a side elevation of my novel device as the same appears when removed from the frame illustrated and which I prefer to employ.

Similar letters designate corresponding parts in both views of the drawings, referring to which:

A is a frame for effecting connection between my novel device and a patient's head and utilizing the patient's head to support the device incidental to adjustment of the movable lens of the latter to determine defects of vision. The said frame A may be of any construction consonant with the purpose of my invention, though I prefer to construct it after the manner of the well known "trial" frame—i. e., have it comprise a nose-piece or bridge a, temples b, and semi-circular holders c, of channel-form in cross-section, extending between and connecting the nose-piece a and the temples b. I also prefer to provide the frame A with a removable disk d which is opaque and is designed to be seated in one of the holders c of the frame while the stationary lens of my novel device is seated in the other holder c of the frame, this in order to exclude the light from one of the patient's eyes during the testing of the other eye. It will be readily understood from this that when the stationary lens of the testing device is positioned in the right hand holder c of frame A, the opaque disk d will be arranged in the left hand holder c of the frame, and when the stationary lens of the testing device is placed in the left hand holder of the frame, the disk d will be placed in the right hand holder thereof.

My novel testing device is illustrated in both figures of the drawings, and by reference to the drawings it will be understood that the device comprises a body plate B having a longitudinal slot e and also having on its upper face a suitable scale f, a finger-piece g fixed to and rising from the body plate B adjacent to the rear end thereof, a stationary lens h arranged below and disposed at a right angle to the body plate and connected with the rear end thereof through the medium of a metallic or other suitable arm i, a slide j disposed in the slot e and having portions k and l disposed below and above the body plate, respectively, and also having a finger-piece m, and a movable lens p arranged parallel to the stationary lens h and connected through the medium of an arm r with the slide j. By virtue of this construction it will be manifest that a person grasping the finger-piece m is enabled to readily move the lens p toward and from the stationary lens h; and it will also be manifest that the slide j and the lens p will remain in the position in which they are placed so as to enable the oculist or optician by observing the pointers s on the slide j and the scale f on the upper side of the body plate to ascertain the character and extent of a defect of the eye.

In the practical use of my improvements, the frame A is placed on the patient's head in the same manner as a pair of spectacles, and when it is desired to subject the right eye to examination, the opaque disk d is placed in the left hand holder c of the frame, and the stationary lens h of the testing device is placed in the right hand holder c of the frame. With this done a test card is located at a suitable distance from the patient's head, and the lens p is moved to the end of the body plate remote from the stationary lens h. The patient is then directed to look at the test card while the operator gradually slides the lens p toward the stationary lens h, and when the patient informs the operator that all of the letters on the test card are clear to him, the operator stops the movable lens and by referring to the pointers and the scale is enabled to readily determine the glass best suited to the eye that is being tested. When the left eye of the patient is to be tested, the stationary lens $h$ is placed in the left hand holder $c$ of frame $A$, and the opaque disk $d$ is placed in the right hand holder $c$, after which the operation described with reference to the right eye is repeated.

I prefer in practice that one of the lenses employed in my novel device be a plus lens and that the other be a minus lens, for then by adjusting one lens with respect to the other and referring to the scale on the body plate B the operator is enabled to readily determine the dioptric strength of lens needed for the eye that is being tested.

It will be gathered from the foregoing that the apparatus described is, as a whole, light and compact, and may therefore be produced at small cost and may be conveniently carried in the pocket or in a small case.

As before stated, the construction herein illustrated and described constitutes the best practical embodiment of my invention of which I am cognizant, but it is obvious that in the future practice of the invention such changes or modifications may be made as fairly fall within the scope of my invention as defined in the claims appended.

Having described my invention, what I claim and desire to secure by Letters-Patent, is:

1. In optical testing means, the combination of a body bearing a scale, a plus lens carried by the body, a minus lens also carried by the body; one of the said lenses being adjustable toward and from the other and being provided with a pointer for coöperating with the scale on the body, and means for effecting connection between the body and a patient's head to utilize the latter to support the body.

2. In optical testing means, the combination with a frame having a nose-piece and holders disposed at opposite sides of the nose-piece; of an opaque disk adapted to be removably arranged in one of the holders of the frame, and a device comprising a body, a lens fixed with respect to the body and adapted to be removably arranged in one of the holders of the frame, and a lens arranged parallel to the first named lens and adjustable on the body toward and from said first named lens and provided with a pointer for coöperating with a scale on the body.

In testimony whereof I have hereunto set my hand in presence of two subscribing witnesses.

HORACE SMITH.

Witnesses:
H. B. CLARK,
N. C. ENGLISH.